(12) United States Patent
Jivani et al.

(10) Patent No.: US 8,675,361 B1
(45) Date of Patent: Mar. 18, 2014

(54) KITCHEN ORGANIZING SYSTEM

(76) Inventors: Zamir Jivani, College Park, GA (US);
Robert Bishop, Oxford, GA (US)

( * ) Notice: Subject to any disclaimer, the term of this patent is extended or adjusted under 35 U.S.C. 154(b) by 72 days.

(21) Appl. No.: 13/525,863

(22) Filed: Jun. 18, 2012

(51) Int. Cl.
| G06F 1/16 | (2006.01) |
| H05K 5/00 | (2006.01) |
| H05K 7/00 | (2006.01) |
| H05K 7/16 | (2006.01) |
| H01J 5/00 | (2006.01) |
| H01J 15/00 | (2006.01) |
| H02G 3/08 | (2006.01) |
| H05K 5/06 | (2006.01) |
| H01R 13/502 | (2006.01) |

(52) U.S. Cl.
USPC ............ 361/679.59; 361/679.01; 361/679.02; 361/679.22; 361/679.6; 361/725; 174/50; 174/50.51; 174/559

(58) Field of Classification Search
USPC ............... 361/679.01, 679.02, 679.06, 679.2, 361/679.21, 679.22, 679.23, 679.25, 361/679.59, 679.6, 725, 726, 730; 174/50, 174/50.5, 50.51, 50.52, 559
See application file for complete search history.

(56) References Cited

U.S. PATENT DOCUMENTS

| D360,882 S | 8/1995 | White |
| 5,884,281 A | 3/1999 | Smith et al. |
| 5,960,440 A | 9/1999 | Brenner et al. |
| 7,292,146 B1 | 11/2007 | Nguyen |
| 7,448,546 B2 | 11/2008 | Jung et al. |
| 2002/0171674 A1 | 11/2002 | Paris |
| 2003/0043109 A1* | 3/2003 | Hong .............................. 345/156 |
| 2005/0137942 A1* | 6/2005 | LaFleur .......................... 705/27 |
| 2006/0074763 A1 | 4/2006 | Schmid |
| 2007/0027366 A1 | 2/2007 | Osburn |
| 2008/0236562 A1 | 10/2008 | Sager et al. |

* cited by examiner

*Primary Examiner* — Hoa C Nguyen
*Assistant Examiner* — Binh Tran

(57) ABSTRACT

A kitchen organizing system for tracking and rotating inventory, generating grocery lists, and suggesting and planning meals has a rotating base. The system has a generally hollow spherical housing located on a base top surface. With a bottom hemisphere front cover and a bottom hemisphere rear cover in place, the housing has a shape of a sphere. The housing has a microprocessor located inside. The housing has a power cord connected to the microprocessor. The housing has a display screen located at least partly in a housing top hemisphere on a housing front side connected to the microprocessor. The housing has a keyboard located on the housing bottom hemisphere front cover connected to the microprocessor. The housing has a printer located in the housing bottom hemisphere connected to the microprocessor. The housing has a scanner located in the housing top hemisphere in the rear side connected to the microprocessor.

5 Claims, 3 Drawing Sheets

KITCHEN ORGANIZING SYSTEM

BACKGROUND OF THE INVENTION

Home computers began to appear during the late 1970s and continued to increase in popularity throughout the 1980s and continuing into present times. Today, most households utilize some kind of home computer or other microprocessor-based home computing device. Applications commonly used on these devices may involve solutions for personal finances, tracking household inventories or computational analysis to aid in decision making. The present invention features a novel kitchen organizing system for tracking and rotating inventory, generating grocery lists, and suggesting and planning meals in a versatile, compact housing.

SUMMARY

The present invention features a kitchen organizing system for tracking and rotating inventory, generating grocery lists, and suggesting and planning meals. In some embodiments, the system has a rotating base. In some embodiments, the system has a generally hollow spherical housing located on a base top surface. In some embodiments, with a bottom hemisphere front cover and a bottom hemisphere rear cover in place, the housing has a shape of a sphere.

In some embodiments, the housing has a microprocessor located inside. In some embodiments, the housing has a power cord operatively connected to the microprocessor. In some embodiments, the housing has a display screen located at least partly in a housing top hemisphere on a housing front side operatively connected to the microprocessor.

In some embodiments, the housing has a keyboard located on the housing bottom hemisphere front cover connected to the microprocessor. In some embodiments, the housing has a printer located in the housing bottom hemisphere connected to the microprocessor. In some embodiments, the housing has a scanner located in the housing top hemisphere in the rear side connected to the microprocessor.

In some embodiments, the system is for tracking and rotating inventory, generating grocery lists, suggesting and planning meals and has a recipe database and a food encyclopaedia.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
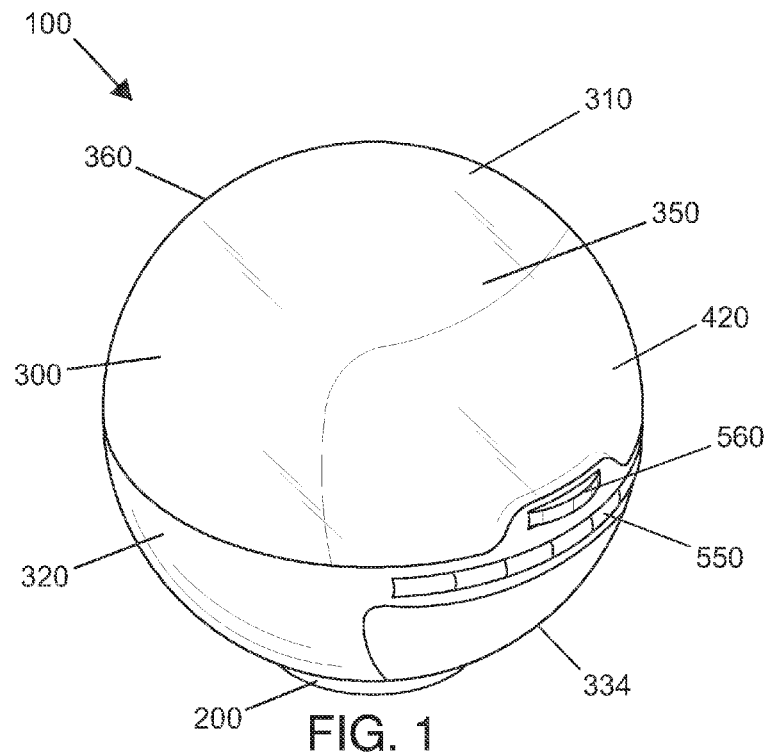
FIG. 1 is a perspective view of the present invention.
Figure 2:
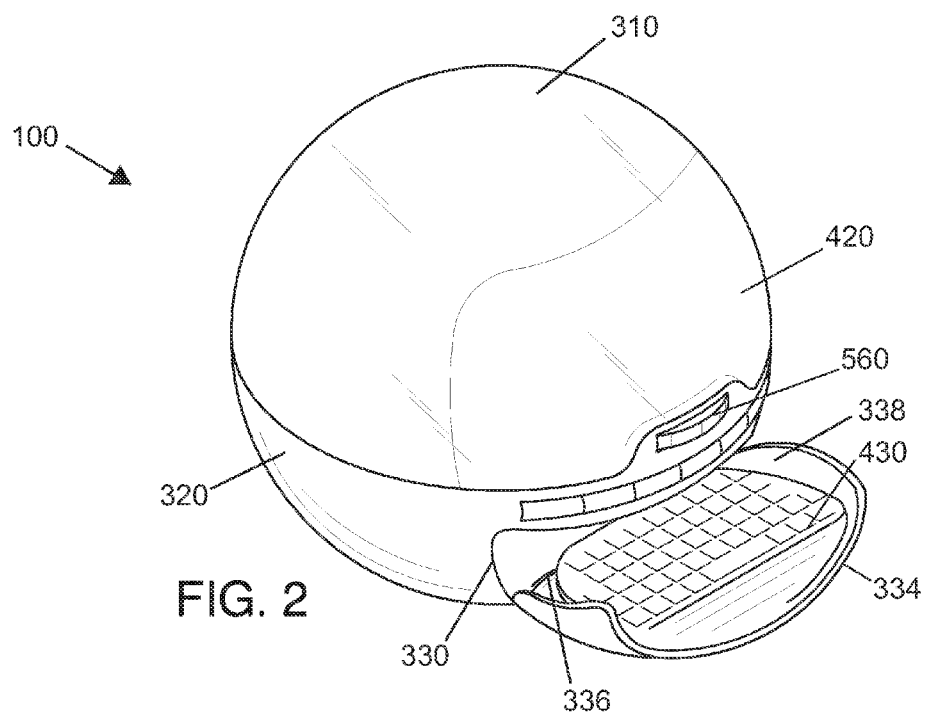
FIG. 2 is a perspective view of the present invention.
Figure 3:
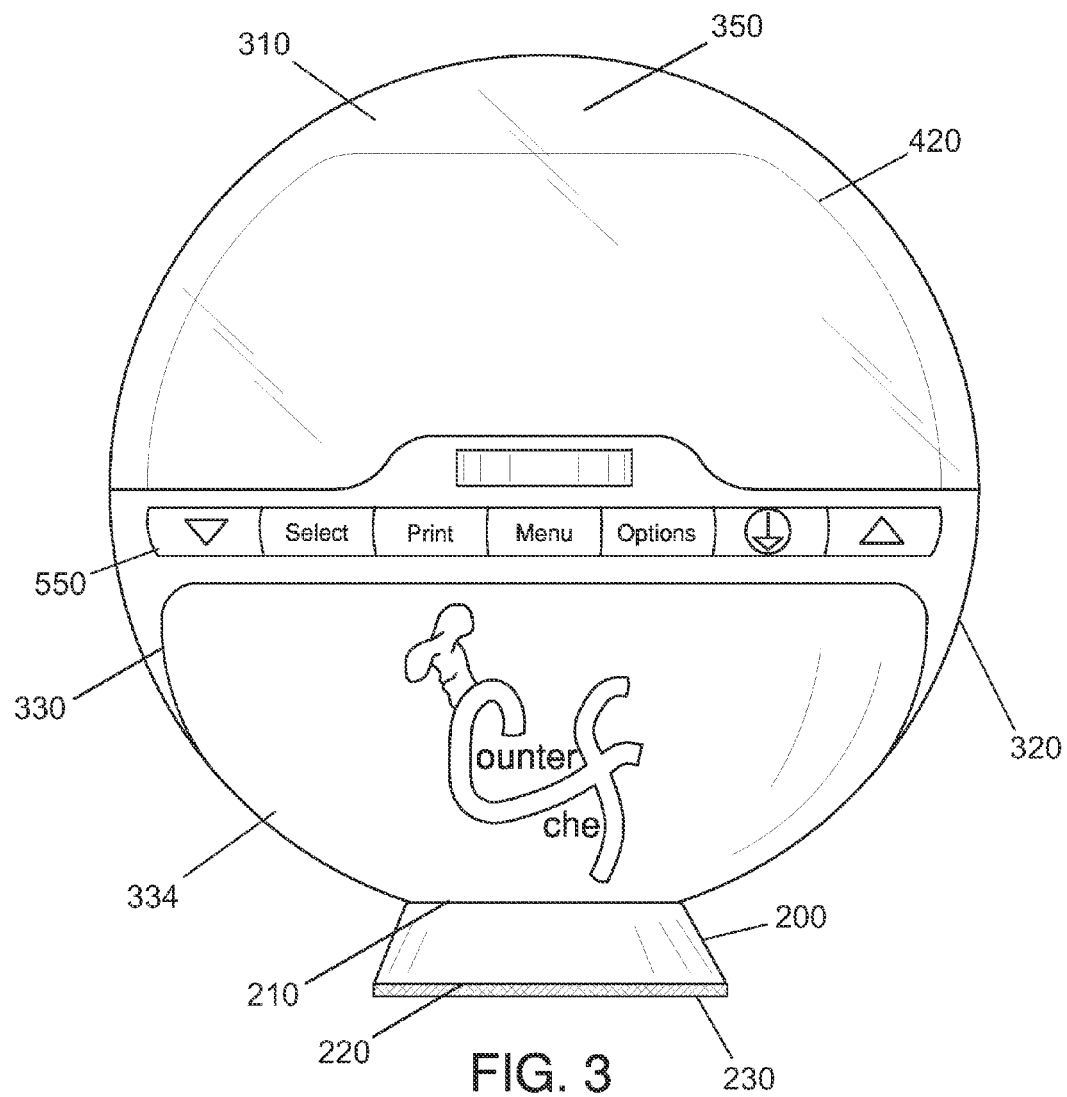
FIG. 3 is a front view of the present invention.
Figure 4:
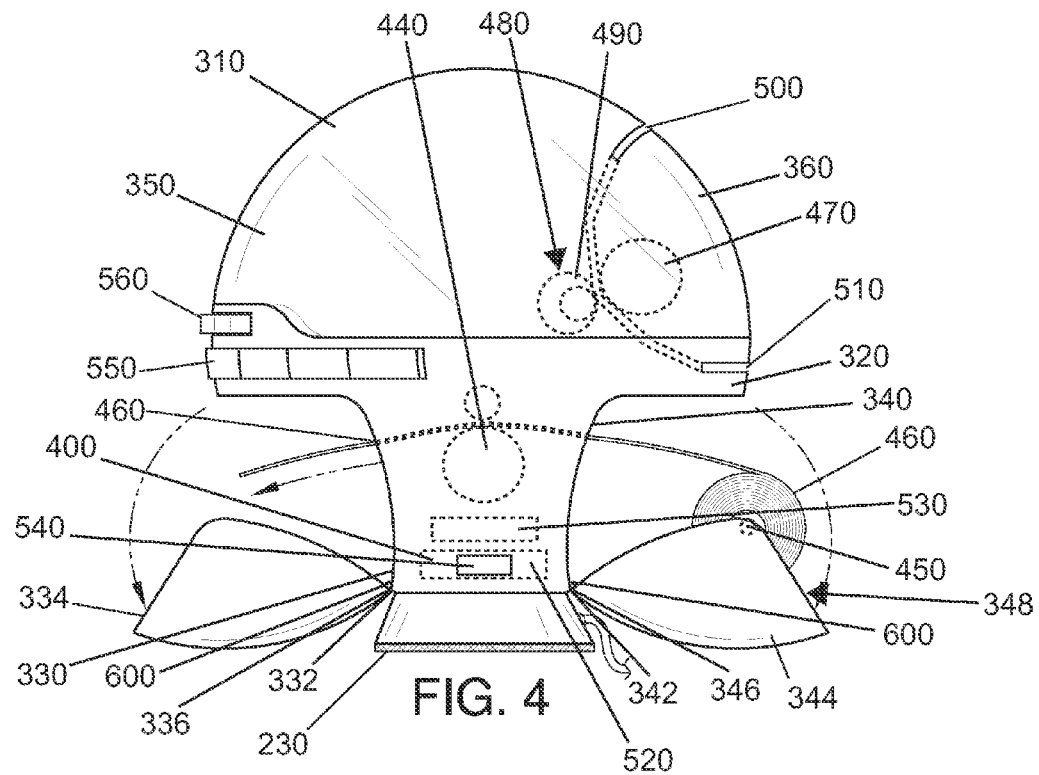
FIG. 4 is a side view of the present invention.
Figure 5:
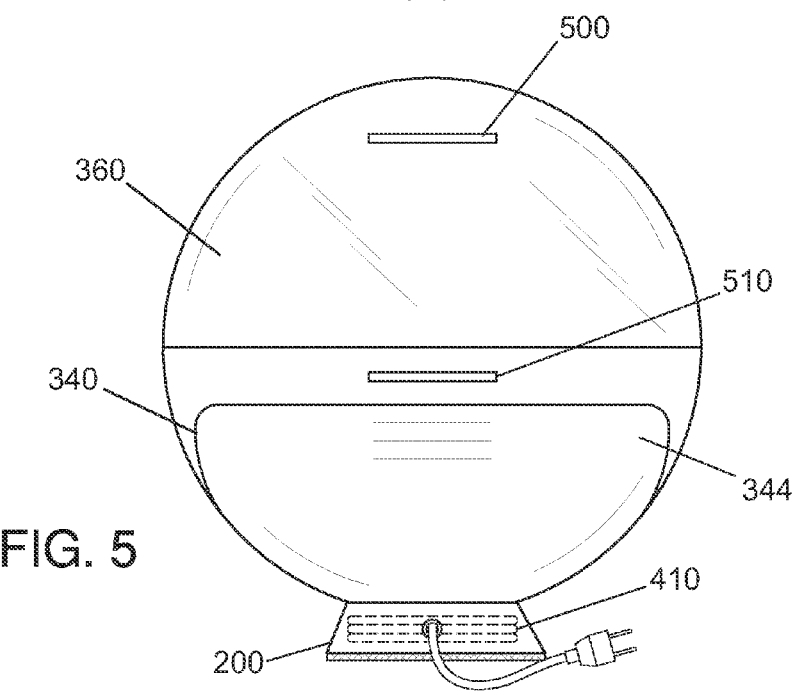
FIG. 5 is a rear view of the present invention.

Following is a list of elements corresponding to a particular element referred to herein:
100 Kitchen organizing system
200 Rotating base
210 Base top surface
220 Base bottom surface
230 Non-slip surface
300 Housing
310 Housing top hemisphere
320 Housing bottom hemisphere
330 Housing bottom hemisphere front side cutout
332 Housing bottom hemisphere front side cutout lower edge
334 Housing bottom hemisphere front side cover
336 Housing bottom hemisphere front side cover bottom edge
338 Housing bottom hemisphere front side cover inside surface
340 Housing bottom hemisphere rear side cutout
342 Housing bottom hemisphere rear side cutout lower edge
344 Housing bottom hemisphere rear side cover
346 Housing bottom hemisphere rear side cover bottom edge
348 Housing bottom hemisphere rear side cover inside surface
350 Housing front side
360 Housing rear side
400 Microprocessor
410 Power cord
420 Display screen
430 Keyboard
440 Printer
450 Printer paper roll mount
460 Printer paper
470 Scanner
480 Roller system
490 Motor
500 Entry slot
510 Exit slot
520 Optical recognition component
530 Wireless communication component
540 Universal serial bus (USB) port
550 Input button
560 Scrolling wheel
600 Hinge Referring now to FIG. 1-5, the present invention features a kitchen organizing system (100) for tracking and rotating inventory, generating grocery lists, and suggesting and planning meals. In some embodiments, the system (100) comprises a rotating base (200) having a base top surface (210), and a base bottom surface (220). In some embodiments, the base (200) rotates about 180 degrees in a first direction and about 180 degrees in a second direction in a horizontal plane parallel to a ground surface. In some embodiments, the base bottom surface (220) comprises a non-slip surface (230) located thereon. In some embodiments, the rotating base (200) comprises a bushing for rotation. In some embodiments, the rotating base (200) comprises a bearing for rotation. In some embodiments, the base (200) freely rotates 360 degrees with no stops. In some embodiments, the base (200) rotates less than about 180 degrees in a first direction and less than about 180 degrees in a second direction.

In some embodiments, the system (100) comprises a generally hollow spherical housing (300) located on a base top surface (210) having a transparent or semi-transparent housing top hemisphere (310), a housing bottom hemisphere (320), a housing front side (350), a housing rear side (360), a housing bottom hemisphere front side cutout (330) for receiving a housing bottom hemisphere front side cover (334), and a housing bottom hemisphere rear side cutout (340) for receiving a housing bottom hemisphere rear side cover (344). In some embodiments, the housing bottom hemisphere front side cutout (330) is opposite the housing bottom hemisphere rear side cutout (340).

In some embodiments, the housing top hemisphere (310) is constructed from glass. In some embodiments, the housing top hemisphere (310) is constructed from acrylic. In some embodiments, the housing top hemisphere (310) is constructed from plastic.

In some embodiments, the pivotally mounted housing bottom hemisphere front side cover (334) has a housing bottom hemisphere front side cover bottom edge (336). In some embodiments, the housing bottom hemisphere front side cover bottom edge (336) comprises a hinge (600). In some embodiments, the housing bottom hemisphere front side cover bottom edge (336) is located on a housing bottom hemisphere front side cutout lower edge (332) via the hinge (600).

In some embodiments, the pivotally mounted housing bottom hemisphere rear side cover (344) has a housing bottom hemisphere rear side cover bottom edge (346). In some embodiments, the housing bottom hemisphere rear side cover bottom edge (346) comprises a hinge (600). In some embodiments, the housing bottom hemisphere rear side cover bottom edge (346) is located on a housing bottom hemisphere rear side cutout lower edge (342) via the hinge (600). In some embodiments, with the housing bottom hemisphere front side cover (334) and the housing bottom hemisphere rear side cover (344) in place, the housing (300) comprises the shape of a sphere.

In some embodiments, the housing (300) comprises a microprocessor (400) located therein. In some embodiments, the housing (300) comprises a power cord (410) operatively connected to the microprocessor (400). In some embodiments, the power cord (410) is for connecting to standard household alternating current power supply. In some embodiments, any excess length of the power cord (410) is coiled and located in the base (200). In some embodiments, the power cord (410) is spring-loaded to retract into the base (200).

In some embodiments, the housing (300) comprises a display screen (420) located at feast partly in the housing top hemisphere (310) on the housing front side (350) operatively connected to the microprocessor (400). In some embodiments, the display screen (420) is visible through the transparent or semi-transparent housing top hemisphere (310). In some embodiments, the display screen (420) measures about 4.3 inches across the face. In some embodiments, the housing (300) comprises a keyboard (430) located on a housing bottom hemisphere front side cover inside surface (338). In some embodiments, the keyboard (430) is operatively connected to the microprocessor (400). In some embodiments, the keyboard (430) is for entering data into the microprocessor (400).

In some embodiments, the housing (300) comprises a printer (440) located in the housing bottom hemisphere (320) between the housing bottom hemisphere front side cutout (330) and the housing bottom hemisphere rear side cutout (340). In some embodiments, the printer (440) is operatively connected to the microprocessor (400). In some embodiments, a printer paper roll mount (450) having a roll of printer paper (460) is located on a housing bottom hemisphere rear side cover inside surface (348). In some embodiments, the printer (440) prints on paper from the roll of printer paper (460). In some embodiments, the printer (440) and the roll of printer paper (460) are oriented in such a way that printer paper (460) can be unrolled from the roll of printer paper (460) and exit the housing (300) via the housing bottom hemisphere front side cutout (330).

In some embodiments, the housing (300) comprises a scanner (470) located in the housing top hemisphere (310) in the rear side. In some embodiments, the scanner (470) is operatively connected to the microprocessor (400). In some embodiments, the scanner (470) is for scanning data into the microprocessor (400) from a piece of printed paper (e.g., a grocery store receipt). In some embodiments, the scanner (470) comprises a roller system (480) located in the housing top hemisphere (310) in the rear side for transporting the printed paper through the scanner (470). In some embodiments, the scanner (470) comprises a motor (490) located in the housing top hemisphere (310) and operatively connected to the power supply for activating the roller system (480) for driving the printed paper through the scanner (470).

In some embodiments, a scanning entry slat (500) is located in housing top hemisphere (310) on the housing rear side (360) and is for receiving a printed paper for scanning. In some embodiments, a scanning exit slot (510) is located in the housing bottom hemisphere (320) on the housing rear side (360) for exit of the printed paper after scanning. In some embodiments, an optical recognition component (520) of the microprocessor (400) generates alphanumeric characters from a scanned image from the printed paper. In some embodiments, the alphanumeric characters are received as input by the microprocessor (400).

In some embodiments, the microprocessor (400) comprises a wireless communication component (Wi-Fi) (530) operatively connected thereto for uploading data to or downloading data from the microprocessor (400) to or from a computer, a mobile phone or other device. In some embodiments, a universal serial bus (USB) port (540) is located in the housing (300). In some embodiments, the USB port (540) is operatively connected to the microprocessor (400). In some embodiments, the USB port (540) is for uploading data to or downloading data from the microprocessor (400) to or from a computer, a mobile phone or other device.

In some embodiments, the housing (300) comprises a plurality of input buttons (550) located on the housing bottom hemisphere (320) on the housing front side (350) operatively connected to the microprocessor (400). In some embodiments, the input buttons (550) are for entering data into the microprocessor (400). In some embodiments, the input buttons (550) include a navigation key, a selection key, a print key, a menu key, and an options key for navigation and interaction with a menu shown on the display screen (420).

In some embodiments, the housing (300) further comprises a scrolling wheel (550) located on the housing bottom hemisphere (320) on the housing front side (350) operatively connected to the microprocessor (400). In some embodiments, the scrolling wheel (560) is for entering data into the microprocessor (400). In some embodiments, the scrolling wheel (560) is for navigating through and interacting with a menu shown on the display screen (420).

In some embodiments, the housing (300) is about 6 inches in diameter. In some embodiments, the housing (300) is about 4 inches in diameter. In some embodiments, the housing (300) is less than 4 inches in diameter. In some embodiments, the housing (300) is about 8 inches in diameter. In some embodiments, the housing (300) is greater than about 8 inches in diameter.

In some embodiments, the system (100) suggests meals based on what is present in the kitchen, the time of preparation, budget, health or heart initiatives (for example, calorie categories: 300 calories or less, or 600 calories or less, etc.), consumer suggestions, vegetarian diets, or nationality. In some embodiments, the system (100) organizes the kitchen by counting inventory, generating grocery lists for recipes (subtracts items already in stock), issuing low stock alerts, remembering preferences (remembers liked recipes and suggests new, similar ones). In some embodiments, the system (100) is a kitchen aid (timer, inventory list), has a printer (prints recipes, grocery lists, and directions), has an alphabetic list of nearly all foods, and has a cooking dictionary (valuable for the amateur chef that includes a brief definition and short examples).

In some embodiments, the system (100) includes WiFi capabilities (can be used for automatic updating), a universal serial bus (USB) port (can be used for updating through a computer), a quick ease button (color coded buttons for commonly used options), a spin dial (for scrolling up and down), a full keyboard, a large vibrant screen (4.3"), an elevated rubber stand (safe from water hazard and has a no slip grip), a 12 v AC plug in, a small thermal printer, and a next step button (when pressed, the button will automatically launch to the next cooking step making cooking all the more easy). In some embodiments, the system (100) is available in multiple colors for any kitchen scheme.

As used herein, the term "about" refers to plus or minus 10% of the referenced number. For example, an embodiment wherein the housing is about 10 inches in length includes a housing that is between 9 and 11 inches in length.

The disclosures of the following U.S. Patents are incorporated in their entirety by reference herein: U.S. Pat. No. D 360,882; U.S. Pat. Pub. No. 2008/0236562; U.S. Pat. Pub. No. 2007/0027366; U.S. Pat. Pub. No. 2006/0074763; U.S. Pat. Pub. No. 2002/0171674; U.S. Pat. No. 7,448,546; U.S. Pat. No. 7,292,146; U.S. Pat. No. 5,960,440; U.S. Pat. No. 5,884,281.

Various modifications of the invention, in addition to those described herein, will be apparent to those skilled in the art from the foregoing description. Such modifications are also intended to fail within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A kitchen organizing system for tracking and rotating inventory, generating grocery lists, and suggesting and planning meals, wherein said system comprises:
 (a) a rotating base having a base top surface and a base bottom surface, wherein the base rotates 180 degrees in a first direction and 180 degrees in a second direction, wherein the base bottom surface comprises a non-slip surface disposed thereon; and
 (b) a generally hollow spherical housing disposed on a base top surface having a transparent or semi-transparent housing top hemisphere, a housing bottom hemisphere, a housing front side, a housing rear side, a housing bottom hemisphere front side cutout for receiving a housing bottom hemisphere front side cover, and a housing bottom hemisphere rear side cutout for receiving a housing bottom hemisphere rear side cover, wherein the housing bottom hemisphere front side cutout is opposite the housing bottom hemisphere rear side cutout, wherein the pivotally mounted housing bottom hemisphere front side cover has a housing bottom hemisphere front side cover bottom edge, wherein the housing bottom hemisphere front side cover bottom edge comprises a first hinge, wherein the housing bottom hemisphere front side cover bottom edge is disposed on a housing bottom hemisphere front side cutout lower edge via the first hinge, wherein the pivotally mounted housing bottom hemisphere rear side cover has a housing bottom hemisphere rear side cover bottom edge, wherein the housing bottom hemisphere rear side cover bottom edge comprises a second hinge, wherein the housing bottom hemisphere rear side cover bottom edge is disposed on a housing bottom hemisphere rear side cutout lower edge via the second hinge, wherein with the housing bottom hemisphere front side cover and the housing bottom hemisphere rear side cover in place, the generally hollow spherical housing comprises the shape of a sphere, wherein the generally hollow spherical housing further comprises:
 (i) a microprocessor disposed therein,
 (ii) a power cord operatively connected to the microprocessor, wherein the power cord is for connecting to standard household alternating current power supply, wherein any excess length of the power cord is coilably disposed in the base,
 (iii) a display screen disposed at least partly in the transparent or semi-transparent housing top hemisphere on the housing front side operatively connected to the microprocessor, wherein the display screen is visible through the transparent or semi-transparent housing top hemisphere,
 (iv) a keyboard disposed on a housing bottom hemisphere front side cover inside surface, wherein the keyboard is operatively connected to the microprocessor, wherein the keyboard is for entering data into the microprocessor,
 (v) a printer disposed in the housing bottom hemisphere between the housing bottom hemisphere front side cutout and the housing bottom hemisphere rear side cutout, wherein the printer is operatively connected to the microprocessor, wherein a printer paper roll mount having a roll of printer paper is disposed on a housing bottom hemisphere rear side cover inside surface, wherein the printer prints on paper from the roll of printer paper, wherein the printer and the roll of printer paper are oriented in such a way that printer paper can be unrolled from the roll of printer paper and exit the generally hollow spherical housing via the housing bottom hemisphere front side cutout,
 (vi) a scanner disposed in the transparent or semi-transparent housing top hemisphere in the rear side, wherein the scanner is operatively connected to the microprocessor, wherein the scanner is for scanning data into the microprocessor from a piece of printed paper, wherein the scanner comprises a roller system disposed in the transparent or semi-transparent housing top hemisphere in the rear side for transporting the printed paper through the scanner, wherein the scanner comprises a motor disposed in the transparent or semi-transparent housing top hemisphere and operatively connected to the power supply for activating the roller system for driving the printed paper through the scanner, wherein a scanning entry slot is disposed in the transparent or semi-transparent housing top hemisphere on the housing rear side and is for receiving a printed paper for scanning, wherein a scanning exit slot disposed in the housing bottom hemisphere on the housing rear side for exit of the printed paper after scanning, wherein an optical recognition component of the microprocessor generates alphanumeric characters from a scanned image from the printed paper, wherein the alphanumeric characters are received as input by the microprocessor, wherein the system is for tracking and rotating inventory, generating grocery lists, suggesting and planning meals and comprises a recipe database and a food encyclopedia.

2. The system of claim 1, wherein the microprocessor comprises a wireless communication component operatively connected thereto for uploading data to or downloading data from the microprocessor.

3. The system of claim 1, wherein a universal serial bus port is disposed in the generally hollow spherical housing, wherein the USB port is operatively connected to the microprocessor, wherein the USB port is for uploading data to or downloading data from the microprocessor.

4. The system of claim 1, wherein the generally hollow spherical housing comprises a plurality of input buttons disposed on the housing bottom hemisphere on the housing front side operatively connected to the microprocessor, wherein the input buttons are for entering data into the microprocessor.

5. The system of claim 1, wherein the generally hollow spherical housing further comprises a scrolling wheel disposed on the housing bottom hemisphere on the housing front side operatively connected to the microprocessor, wherein the scrolling wheel is for entering data into the microprocessor, wherein the scrolling wheel is for navigating through a menu shown on the display screen.

\* \* \* \* \*